3,301,634
PROCESS FOR DECOMPOSING MANGANESE SULFATE TO FORM MANGANOUS OXIDE AND SULFUR DIOXIDE
Harry C. Fuller, Salt Lake City, Utah, assignor to the United States of America as represented by the Secretary of the Interior
No Drawing. Filed July 9, 1963, Ser. No. 293,911
3 Claims. (Cl. 23—145)

The invention herein described and claimed may be manufactured and used by or for the Government of the United States of America for governmental purposes without the payment of royalties thereon or therefor.

This invention relates to decomposition of manganese sulfate.

Manganese sulfate is formed in a variety of industrial processes such as (1) leaching of manganese ores with sulfuric acid or sulfur dioxide, and (2) recovery of $SO_2$ from gases by passing the gases through a water slurry of manganese dioxide. Manganese dioxide and sulfur dioxide are then recovered by decomposition of the manganese sulfate.

In past practice decomposition of manganese sulfate usually has been accomplished by heating in the presence of air. This results in liberation of a gas having a low percentage of $SO_2$ due to dilution by other gases from the air. This procedure also requires such high temperatures that the solid residue often melts and plugs the furnace.

It is, therefore, an object of the present invention to provide a reliable and trouble free method of decomposing manganese sulfate to yield a gas containing a high percentage of $SO_2$.

It is a further object to provide a manganese sulfate decomposition process that will operate at a temperature below the fusion point of any ingredient used in the process.

It has now been found that these objectives may be accomplished by means of a process in which the manganese sulfate is heated to elevated temperature in the presence of a solid reducing agent and in the absence of air or other gases. That is, the reactants and the products of reaction are substantially the only materials present during the reaction. Though the optimum temperature may vary considerably depending on the reducing agent employed, state of subdivision and amounts of reactants, etc., a temperature of about 700° to 800° C. generally gives good results. This is in contrast to conventional decomposition by heating in air which requires temperatures of about 1093° to 1204° C.

The reducing agent may be any of the conventional reducing agents such as coal, coke, silicon, aluminum and manganese matte. Selection of a reducing agent will depend on such factors as cost, product desired and ease of handling. Pyrite has been found to be a particularly effective reducing agent. In addition to effectively decomposing the manganese sulfate pyrite also supplies additional $SO_2$, as well as iron if the product is to be further treated by smelting to produce ferromanganese.

The function of the reducing agent is to reduce part of the manganese sulfate to manganese sulfide according to the following generalized reaction:

$MnSO_4$ + reducing agent = $MnS$ + oxide of reducing agent

The manganese sulfide then reacts with residual manganese sulfate to produce manganous oxide and sulfur dioxide. When pyrite is the reducing agent these reactions become:

$$5MnSO_4 + 4FeS_2 = 5MnS + 8SO_2 + 4FeO$$
$$15MnSO_4 + 5MnS = 20MnO + 20SO_2$$

Combining these reactions and reducing to lowest terms gives the following over-all reaction:

$$5MnSO_4 + FeS_2 = 5MnO + 7SO_2 + FeO$$

The theoretical proportion of reducing agent required can be calculated from the above reactions; however, the optimum quantity is generally best determined experimentally with the theoretical amount used as a guide.

Decomposition of the $MnSO_4$ is most efficiently brought about when the sulfate and reducing agent are brought into intimate contact. This is best accomplished by fine grinding of the reactants which are then well mixed before or during roasting. Since the manganese sulfide formed in the reaction must be brought into contact with residual sulfate, agitation during the course of the reaction is essential for optimum results. This may be accomplished by any conventional means such as (1) the rolling action of a rotary kiln, (2) fluidizing action in a fluidized-bed reactor, (3) the mixing action of the rabbles in multiple hearth roasters, etc.

The decomposition reaction is endothermic for most reducing agents, silicon and aluminum being exceptions. Therefore, it will usually be necessary to supply heat to achieve the required temperature. Since air is excluded during the reaction and substantially only the reactants and products of reaction are present during the reaction, external heating must be employed. This can be done in equipment conventionally used for reducing ores and the like, e.g., externally heated metal rotary kilns, externally heated fluidized-bed reactors and muffled multiple hearth roasters. Examples of such equipment which exclude air are disclosed in U.S. Patents 2,384,862, 2,500,- 295 and 3,087,798. A suitable sealant material for the apparatus of Patent No. 3,087,798 would be the manganese oxide produced by the instant invention. Another suitable apparatus is the Skinner Muffled Multiple Hearth Furnace disclosed in "Chemical Engineering Catalogue," 27th edition, 1942–43, page 356.

The following examples will serve to more particularly describe the invention. In each example the reactants, manganese sulfate and reducing agent, were ground to minus 100-mesh.

Example I

A feed mix comprising manganese sulfate and 4 percent coal was continuously fed into an externally heated laboratory-size rotary kiln furnace. The retention time in the hot zone was about 20 minutes. The furnace was operated so as to exclude air from the interior of the rotary kiln. Roasting the charge at 700° C. eliminated 79.4 percent of the sulfur. The roasted product assayed 53.4 percent Mn and 8.9 percent S. Chemical analyses showed that the evolved gas contained 64.5 percent sulfur dioxide, 7 percent carbon dioxide, 4 percent carbon monoxide, and 0.2 percent oxygen. Such a gas would be ideally suited for leaching manganese oxide ores.

Example II

A feed comprising manganese sulfate and 9.53 percent pyrite was fed continuously into an externally heated laboratory-size rotary kiln furnace. The retention time in the hot zone was about 20 minutes. The kiln was operated so as to exclude air from the interior of the kiln. Roasting the charge at 700° C. eliminated 63.2 percent of the sulfur. The roasted product assayed 41.1 percent Mn, 5.4 percent Fe, 12.2 percent total S, 11.3 percent S as $SO_4$, and 0.9 percent sulfide S. The evolved gas assayed 98.8 percent $SO_2$. In this example the percentage of pyrite employed was such that the calcines would have a manganese-to-iron ratio of 8 to 1. Such a ratio is preferred for smelting to produce standard ferromanganese.

The efficient decomposition of manganese sulfate by the process of the present invention should make possible the utilization of low-grade manganese ores in cyclic $SO_2$ leaching processes. The invention will also permit a more efficient and lower cost recovery of sulfur dioxide from flue gases and waste smelter gases.

What is claimed is:
1. A method of decomposing manganese sulfate to form manganous oxide and a gas high in $SO_2$ content comprising heating said manganese sulfate in a reaction zone in the presence of a reducing agent consisting essentially of $FeS_2$; maintaining substantially only said manganese sulfate, said reducing agent and products of reaction in said zone during the reaction.
2. Method of claim 1 in which the reactants are heated to a temperature of about 700° to 800° C.
3. Method of claim 2 in which the reactants are heated to a temperature of about 700° C.

References Cited by the Examiner

UNITED STATES PATENTS

| | | | |
|---|---|---|---|
| 2,397,824 | 4/1946 | Wanamaker et al. | 23—145 |
| 2,681,268 | 6/1954 | Nossen | 23—145 |
| 2,726,140 | 12/1955 | Miller | 23—145 X |

FOREIGN PATENTS 290,491    5/1928    Great Britain.

OTHER REFERENCES

Handbook of Chemistry and Physics, 44th edition, 1962–1963, pages 604–605, Chemical Rubber Publishing Co.

OSCAR R. VERTIZ, *Primary Examiner.*

B. H. LEVENSON, *Assistant Examiner.*